(12) United States Patent
Frick et al.

(10) Patent No.: US 9,377,115 B2
(45) Date of Patent: Jun. 28, 2016

(54) CHECK VALVE FOR SPRAY NOZZLE AND NOZZLE TUBE

(75) Inventors: Juergen Frick, Weinstadt (DE); Boris Schmidt, Esslingen (DE); Albert Fecht, Riederich (DE)

(73) Assignee: LECHLER GMBH, Metzingen (DE)

( * ) Notice: Subject to any disclaimer, the term of this patent is extended or adjusted under 35 U.S.C. 154(b) by 836 days.

(21) Appl. No.: 13/479,391

(22) Filed: May 24, 2012

(65) Prior Publication Data

US 2012/0298780 A1 Nov. 29, 2012

(30) Foreign Application Priority Data

May 25, 2011 (DE) .................. 10 2011 076 443

(51) Int. Cl.
| | | |
|---|---|---|
| *B05B 1/30* | (2006.01) | |
| *F16K 15/08* | (2006.01) | |
| *F16K 15/12* | (2006.01) | |
| *F16K 17/04* | (2006.01) | |
| *B05B 15/00* | (2006.01) | |

(52) U.S. Cl.
CPC ............... *F16K 15/08* (2013.01); *B05B 1/3006* (2013.01); *F16K 15/12* (2013.01); *F16K 17/0493* (2013.01); *B05B 15/008* (2013.01)

(58) Field of Classification Search
CPC . B05B 15/008; B05B 1/3006; F16K 17/0493; F16K 15/12; F16K 15/08
USPC ......... 239/462, 552, 565, 571, 576, 583, 590, 239/590.3, 591, 592, 597, 599; 137/220, 137/510
See application file for complete search history.

(56) References Cited

U.S. PATENT DOCUMENTS

| | | | | |
|---|---|---|---|---|
| 2,553,919 | A | 5/1951 | Hug | ............... F16K 7/00 137/495 |
| 2,899,975 | A | 8/1959 | Fernandez | ............... F16K 27/02 137/543.17 |
| 3,258,205 | A * | 6/1966 | Hruby, Jr. | ............... 239/204 |
| 3,556,128 | A * | 1/1971 | Scaglione | ............... 137/219 |
| 3,637,187 | A * | 1/1972 | Burger | ............... 251/61.3 |
| 3,915,622 | A * | 10/1975 | Desty et al. | ............... 431/284 |
| 3,923,282 | A * | 12/1975 | Henzler | ............... 251/63.4 |

(Continued)

FOREIGN PATENT DOCUMENTS

| | | |
|---|---|---|
| CN | 1048746 A | 1/1991 |
| CN | 2183825 Y | 11/1994 |

(Continued)

OTHER PUBLICATIONS

Examination Report of the German Patent Office issued in German Application No. 10 2011 076 443.7 dated Feb. 2, 2012 (5 pages).

(Continued)

*Primary Examiner* — Jason Boeckmann
(74) *Attorney, Agent, or Firm* — Flynn, Thiel, Boutell & Tanis, P.C.

(57) ABSTRACT

A check valve for a spray nozzle including a tubular valve body, a shut-off member and a valve seat, wherein the shut-off member is mounted for movement at least in a longitudinal direction of the tubular valve body. The shut-off member is connected to the valve body by a corrugated tube disposed parallel to the longitudinal direction, wherein the shut-off member is biased toward the valve seat due to the spring effect of the corrugated tube. The check valve is suitable for use in, for example, descaling nozzles.

15 Claims, 5 Drawing Sheets

(56) References Cited

U.S. PATENT DOCUMENTS

| | | | |
|---|---|---|---|
| 4,040,445 A * | 8/1977 | McCormick | 137/596.18 |
| 4,620,597 A * | 11/1986 | Lamb | 166/373 |
| 4,848,672 A * | 7/1989 | Matsumoto et al. | 239/590.5 |
| 5,429,277 A | 7/1995 | Kopp et al. | |
| 5,673,858 A | 10/1997 | Asakawa et al. | |
| 5,862,996 A * | 1/1999 | Crichton | 239/583 |
| 6,360,440 B1 * | 3/2002 | Perry et al. | 29/890.13 |
| 7,055,542 B2 * | 6/2006 | Delobel et al. | 137/219 |
| 7,841,548 B2 | 11/2010 | Fecht et al. | |
| 2003/0052199 A1 | 3/2003 | Ikeuchi et al. | |
| 2007/0235559 A1 * | 10/2007 | Miyake | 239/205 |
| 2008/0283635 A1 * | 11/2008 | Fecht et al. | 239/590 |
| 2011/0110811 A1 | 5/2011 | Fecht et al. | |
| 2011/0220811 A1 | 9/2011 | Dick et al. | |

FOREIGN PATENT DOCUMENTS

| | | | |
|---|---|---|---|
| CN | 101773889 A | 7/2010 | |
| DE | 298 15 321 U1 | 1/1999 | |
| DE | 198 25 574 A1 | 12/1999 | |
| DE | 103 43 825 A1 | 4/2005 | |
| DE | 10 2007 024 247 B3 | 11/2008 | |
| EP | 2 127 755 A1 | 12/2009 | |
| EP | 2127755 A1 * | 12/2009 | ............... B05B 1/30 |
| GB | 344 636 | 3/1931 | |
| GB | 344636 * | 3/1931 | ............. F61K 23/00 |
| JP | 6-154685 A | 6/1994 | |
| JP | 2003-159549 A | 6/2003 | |
| JP | 2005-8178 | 1/2005 | |
| RU | 2 271 873 C1 | 3/2006 | |
| WO | WO 99/64164 | 12/1999 | |

OTHER PUBLICATIONS

Lechler GmbH brochure entitled WSV WaterStop Valve for SCALEMASTER® Nozzles, Jan. 2007 (4 pages).

European Patent Office Search Report issued in European Application No. 12 16 7835 dated Jan. 15, 2013 with English translation of category of cited documents (6 pages).

English translation of Chinese Office Action issued in Appln. No. 201210229980.3 dated Aug. 6, 2015 (5 pages).

English translation of Japanese Office Action issued in Appln. No. 2012-120023 mailed Jan. 5, 2016 (6 pages).

English translation of the Russian Office Action issued in Appln. No. 2012120616/05(031080) dated Jan. 29, 2016 (4 pages).

* cited by examiner

CHECK VALVE FOR SPRAY NOZZLE AND NOZZLE TUBE

CROSS REFERENCE TO RELATED APPLICATION

This application claims the priority of German Application No. 10 2011 076 443.7, filed May 25, 2011, the disclosure of which is hereby incorporated by reference in its entirety into this application.

FIELD OF THE INVENTION

The invention relates to a check valve for a spray nozzle comprising a valve body, a shut-off member, and a valve seat, in which the shut-off member is disposed so as to be capable of movement at least in a longitudinal direction of the valve body. The invention also relates to a nozzle tube comprising a filter for plugging into a feed line.

BACKGROUND OF THE INVENTION

The product range of the applicant Lechler GmbH includes a so-called water stop valve for descaling nozzles, cf. the brochure WSV "Water Stop Valve for Scalemaster Nozzles", Lechler GmbH, January 2007. The water stop valves or check valves depicted therein comprise a tubular valve body, in which a conical shut-off member is disposed so as to be capable of movement in the longitudinal direction of the tubular valve body. The valve body is biased toward a valve seat due to the action of a compression spring. The tubular valve body is part of a nozzle tube and the valve seat is provided on a filtering element. The filtering element then forms an extension of the tubular valve body which is in turn provided with a spray nozzle at its other end. The entire nozzle tube including the spray nozzle is then partially plugged into a feed line or a welded nipple of a spray boom such that the filtering element is disposed inside the spray boom and fluid to be sprayed can flow from the feed line into the atmosphere by way of the spray nozzle. Such known check valves and nozzle tubes are used in the process of descaling hot metal surfaces, more particularly in rolling mill trains, and are intended to prevent the discharge of significant amounts of fluid from the spray nozzle when the fluid pressure drops.

It is an object of the invention to provide an improved check valve and an improved nozzle tube.

To this end, according to the invention, a check valve for a spray nozzle is provided, in which the spray nozzle comprises a valve body, a shut-off member, and a valve seat, the shut-off member being mounted so as to be capable of movement at least in a longitudinal direction of the valve body, and the shut-off member is connected to the valve body by means of a corrugated tube disposed so as to extend in a direction parallel to the longitudinal direction, and in which the shut-off member is biased toward the valve seat due to the spring effect of the corrugated tube.

The shut-off member can be connected by means of a corrugated tube to the valve body, which is tubular in shape for example, so as to be capable of movement together with said corrugated tube in the longitudinal direction of said valve body. Thus it is possible to dispense with a separate compression spring and to simplify the check valve of the invention.

In a development of the invention, pressurized fluid to be sprayed acts upon the corrugated tube both on its radially inwardly located internal surface and on its radially outwardly located external surface at least in the open state of the check valve.

In this way, there is the assurance that, even in the case of extremely high pressures of the fluid to be sprayed amounting to several hundred bar, the corrugated tube will not be deflected laterally, which might consequently alter the biasing force applied by the corrugated tube to the shut-off member. Rather, the pressures acting on the corrugated tube radially inwardly and radially outwardly thereof cancel each other out so that the corrugated tube remains capable of free movement in and against the shut-off direction of movement. In order to achieve such application of pressure to both sides of the corrugated tube, provision may be made for a first flow channel to form between the shut-off member and an internal surface of the nozzle tube, through which flow channel pressurized fluid will act upon the radially outwardly located surface of the corrugated tube. A flow channel can form between the internal surface of the nozzle tube and a shroud tube at the downstream end of the shroud tube so that pressurized fluid can act upon the radially inwardly located surface of the corrugated tube. Alternatively, the corrugated tube forms part of the flow channel with its radially inwardly located surface.

In a development of the invention, a shroud tube is provided within the corrugated tube and forms part of a fluid channel through the check valve.

The provision of a shroud tube within the corrugated tube, with the shroud tube being advantageously plain cylindrical in shape and comprising smooth walls, can ensure that there is very little flow loss in the check valve, since the shroud tube and not the corrugated tube forms part of the flow channel so that turbulences are reduced. In spite of the provision of the shroud tube, it is possible to achieve a large cross-section of free flow of the fluid flowing through the device. Advantageously, the shroud tube has a constant diameter.

In a development of the invention, the shroud tube is connected firmly at one end thereof to the shut-off member and is mounted at its other end so as to be capable of movement in relation to the valve body.

In this way, a continuous fluid channel having smooth walls can be achieved between the movable shut-off member and the opposing movable end of the shroud tube. Depending on the wall thickness of the shroud tube, there is only one step between the movable end of the shroud tube and the nozzle tube, the radial extent of the step being equal to the wall thickness of the shroud tube. The provision of a corrugated tube in place of a helical spring offers the advantage that less space is required than when use is made of a helical spring having the same biasing force. Thus a larger cross-section of free flow can be provided inside the shroud tube and lower flow loss is achieved.

In a development of the invention, the shut-off member is disposed at an upstream end of the corrugated tube as regarded in the direction of flow.

In this way, a long flow-calming region can be provided downstream of the shut-off member, which flow-calming region assists in reducing turbulences and thus in achieving reduced resistance to flow. Even at very high fluid pressures as are used on descaling nozzles, it is possible to achieve an improved spray pattern by means of the spray nozzle disposed downstream of the shut-off member and downstream of the corrugated tube.

In a development of the invention, the shut-off member is annular in shape and the valve seat is frustoconical, at least in part, and the shut-off member rests, in a closed position, on a conical surface of the valve seat.

A good sealing effect can be achieved at a low bearing pressure by means of an annular shut-off member and a frustoconical valve seat. More particularly, it is alternatively possible to design the valve seat with a flow-optimizing configuration. The annular shut-off member can be adapted to match the inside diameter of the corrugated tube so that the cross-section of free flow is not reduced in the transition region between the annular shut-off member and the corrugated tube.

In a development of the invention, the valve seat is provided on a valve seat disk that is positioned in a fluid channel of the check valve and is provided with at least one duct.

These measures improve the ease of production of the check valve of the invention, since the valve seat disk can be readily inserted into a tubular valve body.

In a development of the invention, the at least one duct is formed by means of a through bore and/or a groove in the valve seat disk. Advantageously, the at least one duct is in the form of an arcuately shaped elongated hole in the valve seat disk.

Such arcuately shaped elongated holes can be disposed so as to surround the valve seat concentrically and offer less resistance to flow than a circular bore, since a larger cross-section of free flow can be achieved and the flow needs to be deflected less sharply.

In a development of the invention, the valve seat is part of a streamlined body.

In this way, it is possible to achieve increased reduction of the resistance to flow and also to substantially improve the spray pattern of a nozzle on which liquid guided through the check valve is caused to impinge. This is of considerable advantage, particularly in the case of high fluid pressures as are applied to descaling nozzles.

In a development of the invention, the shut-off member is annular in shape and the streamlined body extends through the shut-off member.

This measure makes it possible for the fluid to be guided through the annular shut-off member and into the shroud tube when the check valve is open. Thus the flow can be significantly calmed at the critical transition point between the shut-off member and the following streamlined body or shroud tube.

In a development of the invention, the streamlined body tapers in the region of the valve seat and increases in diameter (widens) again downstream of the valve seat, as regarded in the direction of flow.

Surprisingly, the flow in the flow channel downstream of the shut-off member or valve seat can be significantly calmed when the streamlined body widens again following its tapered portion disposed in the region of the valve seat. By means of such widening of the streamlined body following its tapered region at the valve seat, the fluid is forced against the internal wall of the flow channel or the shroud tube, as a result of which, surprisingly, there are achieved a reduction in the resistance to flow and a calming effect on the flow.

In a development of the invention, the streamlined body tapers again to form an end tip following its widened portion disposed downstream of the valve seat, as regarded in the direction of flow.

The gradual taper of the streamlined body ensures reduced resistance to flow and a calming effect on the flow. The streamlined body thus tapers in the region of the valve seat, widens again following this tapered region, and then tapers off gradually to form an end tip. Advantageously, the streamlined body comprises, upstream of the valve seat, a tip which points against the direction of flow and from which point the streamlined body can then expand conically. Advantageously, the streamlined body is connected by means of individual bridges to a housing of the check valve, and these bridges form part of a valve seat disk, for example. In the region of the valve seat disk, the streamlined body can then extend parallel to the longitudinal center axis of the check valve. On the whole, the streamlined body thus exhibits an initially conically widened shape starting from a tip, as regarded in the direction of flow. The external walls of the streamlined body then extend substantially parallel to a longitudinal center axis in the region of the valve seat disk and its ducts. Following this region extending parallel to the longitudinal center axis, the streamlined body tapers to form the valve seat in this region. The valve seat is formed by a tapered region. Following a local minimum diameter, the streamlined body widens again. Advantageously, this transition from the tapered portion to the renewed widening is curved in shape. Following its widened region, the streamlined body tapers again to form an end tip. Advantageously, this transition from the widened region to the following tapered region is also curved in shape. The final tapered region extending to the end tip can be gradual and its length is equal to approximately half the length of the entire streamlined body.

The object of the invention is also achieved by means of a nozzle tube which comprises a filter and which is intended to be plugged into a feed line and which is provided with a check valve of the invention.

In such a nozzle tube, a shroud tube can be provided within the corrugated tube and the valve seat can be part of a streamlined body, and a jet straightener is disposed downstream of the streamlined body in the shroud tube in a development of the invention.

Turbulences that may not have subsided completely can be reduced further by the provision of a jet straightener in the shroud tube and a good spray pattern that remains constant over time can be achieved by means of a spray nozzle disposed on the nozzle tube even at high fluid pressures as are used on descaling nozzles.

In a development of the invention, the jet straightener comprises a plurality of flow control surfaces that extend in the radial direction toward a longitudinal center axis of the jet straightener, and a region immediately surrounding the longitudinal center axis is free from fixtures.

A good straightening effect on the flow accompanied by low resistance to flow can be achieved by means of such a jet straightener.

In a development of the invention, there is formed a fluid channel of constant cross-section downstream of the jet straightener.

Such a fluid channel of constant cross-section downstream of the jet straightener and upstream of a spray nozzle has proved to be advantageous for achieving reduced resistance to flow and a good spray pattern.

Additional features and advantages of the invention are revealed in the claims and the following description of preferred embodiments of the invention with reference to the drawings. Individual features of the various embodiments can be combined in an arbitrary manner without going beyond the scope of the invention.

DETAILED DESCRIPTION

Figures 1, 2, 3:
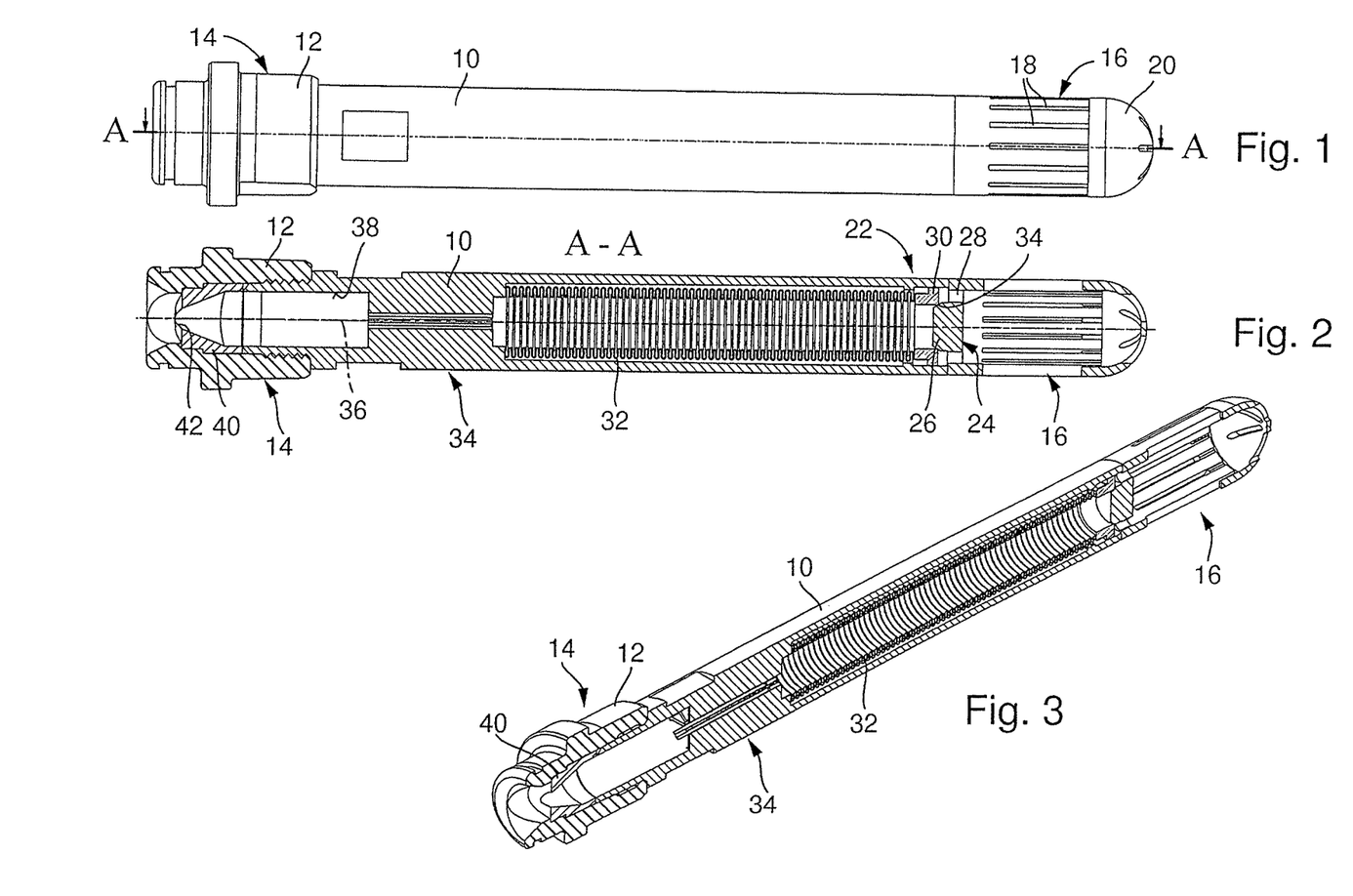
FIG. 1 is a side view of a nozzle tube of the invention according to a preferred embodiment of the invention and a spray nozzle disposed on said nozzle tube.
FIG. 2 is a view of the cross-sectional plane A-A shown in FIG. 1.
FIG. 3 is an isometric illustration of the nozzle tube, of which the cross-sectional view is shown in FIG. 2.

The illustration shown in FIG. 1 shows a nozzle tube 10 that is provided at one end with a union nut 12 that serves for the attachment of a nozzle mouthpiece (not shown in FIG. 1). The union nut 12 and the nozzle mouthpiece form a spray nozzle 14.

At its end remote from the spray nozzle 14, the nozzle tube 10 is provided with a filtering element 16. The filtering element 16 comprises a plurality of inlet slots 18 extending in the longitudinal direction of the nozzle tube 10 and is provided with a filter cap 20 that likewise comprises inlet slots for fluid.

When put into operation, the nozzle tube 10 is placed in a welded nipple of a spray boom for fluid to be sprayed such that at least the filtering element 16 is disposed inside the spray boom with the spray nozzle 14 located outside the spray boom. Fluid to be sprayed can then enter the nozzle tube 10 through the filtering element 16 and will be sprayed by means of the spray nozzle 14. The nozzle tube 10 is intended for use in descaling nozzles, in which fluid, for example water, is sprayed at very high pressures of several hundred bar within a rolling mill train against a hot metal surface such as steel or copper in order to remove a layer of scale from the metal surface.

In order to prevent significant amounts of fluid from being discharged from the spray nozzle 14 when the fluid pressure has dropped, the nozzle tube 10 is provided with a check valve 22, as shown in the view of the cross-sectional plane A-A in FIG. 2. The check valve 22 comprises a valve seat disk 24 comprising a frustoconical valve seat 26 and a plurality of ducts 28. The check valve 22 further comprises an annular shut-off member 30 that is connected by means of a corrugated tube 32 to the nozzle tube 10 that forms a valve body for the check valve 22. The shut-off member 30 rests with its plain cylindrical external periphery against an internal wall of the nozzle tube 10 or is disposed at only a short distance from the internal wall thereof and is thus only capable of movement in the longitudinal direction of the nozzle tube 10. The shut-off member 30 is biased toward the valve seat 26 by means of the corrugated tube 32.

The illustration shown in FIG. 2 shows the closed state of the check valve 22. The shut-off member 30 has a concentric through bore, and a circular edge is located at the transition between an annular end face of circular cross-section and the through bore. The annular shut-off member 30 rests with this circular edge against a frustoconical external surface of the valve seat 26 and it thus prevents fluid from flowing past the valve seat 26 into the interior of the corrugated tube 32 and thus to the spray nozzle 14.

When the fluid pressure exerted on the valve seat 26 rises to an extent that causes the biasing force of the corrugated tube 32 to be overcome, the annular shut-off member 30 is pushed to the left in the illustration shown in FIG. 2 and fluid can flow past the valve seat 26 and through the through bore in the annular shut-off member 30. When the fluid pressure exerted on the valve seat 26 drops, the annular shut-off member 30 is again pressed against the valve seat 26 by the spring effect of the corrugated tube 32 so that the flow of fluid between the filtering element 16 and the spray nozzle 14 is blocked. Accidental spraying or squirting of fluid through the nozzles in the case of a low pilot pressure of the descaling system can thus be reliably prevented. The pilot pressure generates a force that is less than the biasing force of the corrugated tube 32. Furthermore, it is thus possible to reliably prevent the spray nozzle 14 from dripping.

With reference to the illustration shown in FIG. 2, it may be seen that the cross-section of free flow downstream of the annular shut-off member 30 is not constricted by the corrugated tube 32. The smallest inside diameter of the corrugated tube 32 is just slightly larger than the diameter of the through bore in the shut-off member 30. Additionally, the corrugated tube 32 is of considerable length, with the shut-off member 30 being disposed at the upstream end of the corrugated tube 32. Turbulences resulting when fluid flows past the valve seat 26 and the shut-off member 30 can thus subside as the fluid flows through the corrugated tube 32. The arrangement of the frustoconical valve seat 26 concentrically relative to a longitudinal center axis of the nozzle tube 10, with the annular shut-off member 30 resting on an external surface of the valve seat 26, makes it possible to provide a flow-optimizing design of the check valve 22. The fluid flowing through the ducts 28 flows along the tapered valve seat 26, flows through the through bore in the annular shut-off member 30, and then flows into the corrugated tube 32. It is apparent that the flow need not be deflected sharply as it flows through the check valve 22, but rather, the necessary flow deflections are in all cases well below 90°.

A jet straightener 34 is disposed downstream of the corrugated tube 32. The jet straightener 34 is integral with the nozzle tube 10 and comprises a plurality of flow control surfaces extending inwardly in the radial direction. The flow control surfaces extend toward a longitudinal center axis 36 of the nozzle tube 10 and they extend in a direction parallel to this longitudinal center axis 36. The region immediately surrounding the longitudinal center axis 36 is free from fixtures. For this reason, the jet straightener 34 is also referred to as a coreless jet straightener. A fluid channel 38 of constant cross-section follows on the jet straightener 34 downstream thereof. This fluid channel 38 than merges into a nozzle mouthpiece 40 that reduces the free cross-section and has a discharge orifice 42. The nozzle mouthpiece 40 is retained on the nozzle tube 10 by means of the union nut 12.

The nozzle tube 10, the filtering element 16, and the jet straightener 34 are fabricated by means of a sintering process. For this purpose, metal powder is mixed with a plastics binder and is brought into the desired shape by means of die casting. Following the removal of the plastics binder, the intermediate product is sintered to give a sintered metal component. This manufacturing process makes it possible for the jet straightener 34 to be sintered together with the nozzle tube 10 and also for the valve seat disk 24 to be sintered together with the filtering element 16. The filter cap 20 can be manufactured as a separate unit, but is subsequently likewise sintered together with the remainder of the filtering element 16.

The nozzle mouthpiece 40 can be made of carbide metal and likewise manufactured in the form of a sintered component and it is also referred to as a carbide insert.

Figures 4, 5, 6, 7, 8, 9:
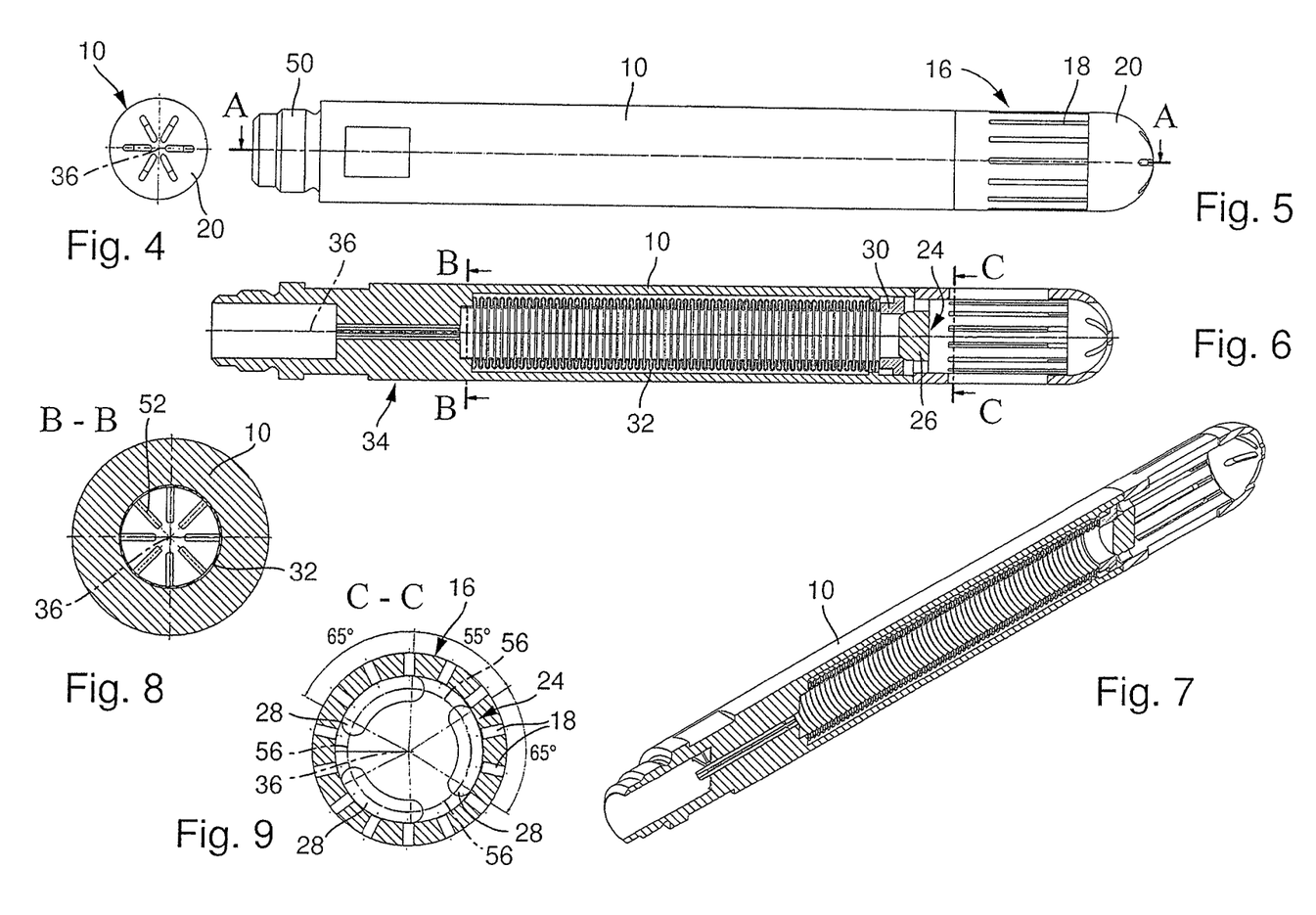
FIG. 4 is a rear view of the nozzle tube shown in FIG. 1, with the spray nozzle omitted.
FIG. 5 is a side view of the nozzle tube shown in FIG. 4.
FIG. 6 is a view of the cross-sectional plane A-A shown in FIG. 5.
FIG. 7 is an isometric illustration of the nozzle tube, of which the cross-sectional view is shown in FIG. 6.
FIG. 8 is a view of the cross-sectional plane B-B shown in FIG. 6.
FIG. 9 is a view of the cross-sectional plane C-C shown in FIG. 6.

The illustration shown in FIG. 4 is a top view of the nozzle tube 10, with the spray nozzle 14 omitted so that only the filter cap 20 is visible. In all, five inlet slots extending radially toward the longitudinal center axis 36 of the nozzle tube 10 are visible in the figure.

The illustration shown in FIG. 5 is a side view of the nozzle tube 10, in which the union nut 12 that is also referred to as the mouthpiece housing is not screwed onto the nozzle tube. At its front end located in the left half of FIG. 5, the nozzle tube 10 has a male screw thread 50 for the purpose of screwing the union nut 12 onto the nozzle tube. As mentioned above, the nozzle tube 10 and the filtering element 16 are sintered together or laser welded to form an inseparable unit.

The illustration shown in FIG. 6 is a view of the cross-sectional plane A-A indicated in FIG. 5, and the components already explained above will not be described again here, in order to avoid repetition.

It may be seen with reference to the illustration shown in FIG. 6 that the corrugated tube 32 is attached to the annular shut-off member 30 by means of a first end that encompasses the external surface of the annular shut-off member 30. The point at which the corrugated tube 32 is attached to the annular shut-off member 30 is thus located outside the region in which the fluid flows through the through bore in the shut-off member 30. The second end of the corrugated tube 32, disposed downstream, is then welded to the internal surface of a suitable bore in the nozzle tube 10, with the bore then merging into the jet straightener 34.

The illustration shown in FIG. 7 is an isometric illustration of the nozzle tube 10, of which the cross-sectional view is shown in FIG. 6.

The illustration shown in FIG. 8 is a view of the cross-sectional plane B-B shown in FIG. 6. In this cross-sectional view, flow control surfaces 52 of the jet straightener 34 can be seen to extend radially toward the longitudinal center axis 36 of the nozzle tube, which surfaces 52 are disposed in a direction that is parallel to the longitudinal center axis 36. The region immediately surrounding the longitudinal center axis 36 is free from fixtures. The plain cylindrical end of the corrugated tube 32 is shown in FIG. 8.

The illustration shown in FIG. 9 is a view of the cross-sectional plane C-C shown in FIG. 6. The figure shows the filtering element 16 comprising the inlet slots 18 disposed radially in the tubular wall of the filtering element 16. The inlet slots 18 are equally spaced around the periphery of the filtering element 16.

This figure likewise shows the valve seat disk 24 and, more particularly, three ducts 28 within the valve seat disk. The three ducts 28 are each in the form of an arcuately shaped elongated hole. A center line of the arcuate elongated holes 28 is located on a circle that concentrically surrounds the longitudinal center axis 36 of the nozzle tube. A wall of the arcuate elongated holes 28 located outwardly in the radial direction coincides with an internal wall of the filtering element 16. The arcuate elongated holes extend inwardly toward the longitudinal center axis 36 up to the valve seat 26, as can be seen in the cross-sectional view shown in FIG. 6.

The ends of the arcuate elongated holes 28 are each semi-circular in shape, and the centers of said semicircles are spaced apart from each other by an angle of 65°. The centers of the semicircular ends of two adjacent elongated holes 28 are spaced apart by 55°.

It is possible to achieve a large cross-section of free flow and a reduced resistance to flow through the valve seat disk 24 by means of the three arcuate elongated holes 28, while at the same time the material bridges 56 between the arcuate elongated holes 28 are stable enough to resist even very high fluid pressures of several hundred bar.

Figures 10, 11:
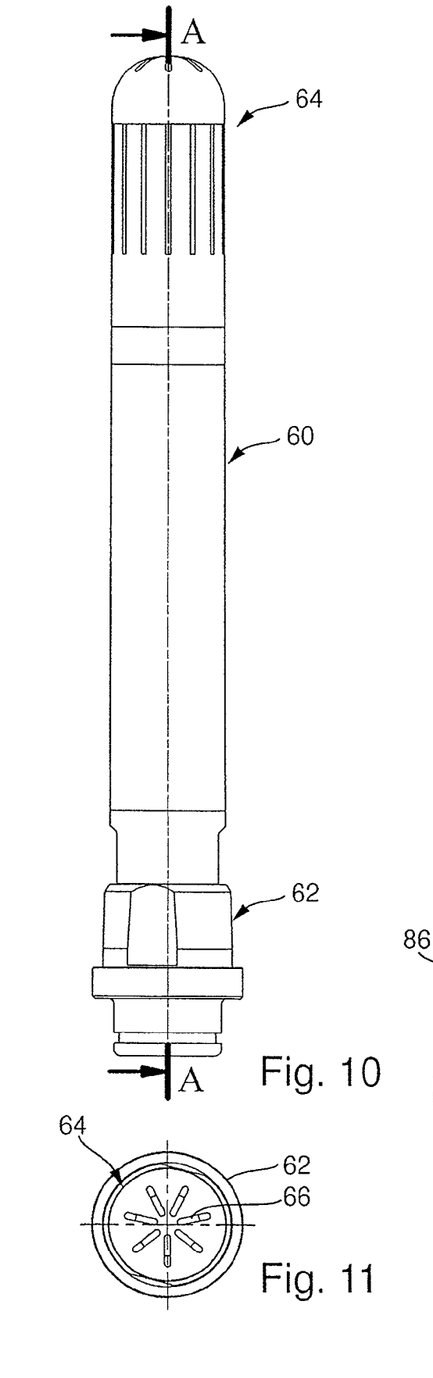
FIG. 10 is a side view of a nozzle tube of the invention according to a second preferred embodiment of the invention and of a spray nozzle disposed on said nozzle tube.
FIG. 11 is a top view of the nozzle tube shown in FIG. 10.

The illustration shown in FIG. 10 is a side view of a nozzle tube 60, at the downstream end of which there is disposed a spray nozzle 62. The nozzle tube 60 is intended to be plugged into a feed line or a spray boom for fluid to be sprayed, so that at least a filtering portion 64 of the nozzle tube is then located in the feed line, while the line of communication between the feed line and the spray nozzle 62 is closed such that the spray nozzle 62 partially no longer communicates with the feed line and can thus release fluid.

The spray nozzle 62 is screwed onto the downstream end of the nozzle tube 60.

The top view shown in FIG. 11 shows, in particular, the filter 64 comprising a plurality of inlet slots 66, which filter 64 is basically designed in a manner identical to the filter 16 described above with reference to FIGS. 1 to 9.

Figures 12, 13:
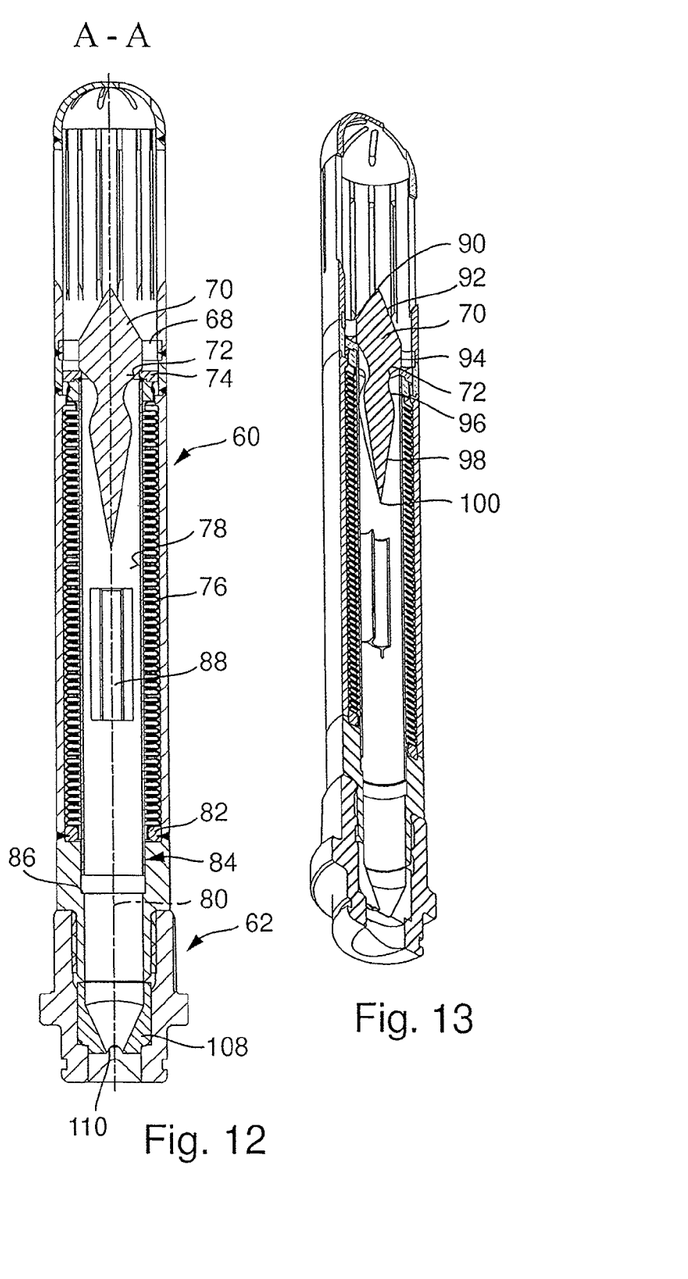
FIG. 12 is a view of the cross-sectional plane A-A shown in FIG. 10.
FIG. 13 is a perspective view of the nozzle tube, of which the cross-sectional view is shown in FIG. 12.

The cross section illustrated in FIG. 12 shows the check valve disposed inside the nozzle tube 60. The check valve comprises a valve seat disk 68 comprising a streamlined body 70 that forms a valve seat 72 in a region tapered conically in the direction of flow. In the position shown in FIG. 12, there rests on this valve seat 72 an annular shut-off member 74, which thus blocks the passage of fluid through the nozzle tube 60. The annular shut-off member 74 is rigidly connected, for example welded, to a corrugated tube 76 and to a shroud tube 78 disposed inside the corrugated tube. The annular shut-off member 74 rests, on the one hand, against the valve seat 72 of the streamlined body 70 and, on the other hand, against an internal surface of the nozzle tube 60 and is configured so as to be capable of movement in a direction parallel to the longitudinal center axis 80 of the nozzle tube 60. Starting from the position shown in FIG. 12, the shut-off member 74 can thus be lifted from the valve seat 72 when it is moved downwardly with reference to the illustration shown in FIG. 12.

At its end remote from the shut-off member 74, the corrugated tube 76 is welded to the nozzle tube 60 in a region 82. By contrast, the shroud tube 78 is accommodated by means of its end remote from the shut-off member 74 in a region 84 so as to be capable of movement within the nozzle tube 60. For this purpose, the shroud tube 78 rests with its external wall against an internal wall of the nozzle tube 60 in the region 84, and the clearance between the shroud tube 78 and the nozzle tube 60 is such that the shroud tube 78 can be moved in a direction parallel to the longitudinal center axis 80.

The corrugated tube 76 is biased in the position shown in FIG. 12, causing it to press the shut-off member 74 against the valve seat 72 on the streamlined body 70. When the fluid pressure upstream of the shut-off member 74 rises above a predefined value governed by the biasing force of the corrugated tube 76, the shut-off member 74 is moved in the direction of flow, i.e. downwardly with regard to the illustration shown in FIG. 12, and fluid can flow through the space between the shut-off member 74 and the valve seat 72 into the interior of the shroud tube 78 and thus to the spray nozzle 62. When the shut-off member 74 moves downwardly in the direction of flow in the illustration shown in FIG. 12, the corrugated tube 76 is compressed, and the shroud tube 78 is likewise moved downwardly and it then slides on the internal surface of the nozzle tube 60 in the region 84. The nozzle tube 60 has a circumferential step 86 downstream of the region 84 for the shroud tube 78, with the circumferential step 86 serving as a stop for the shroud tube 78. As soon as that end of the shroud tube 78 which is remote from the shut-off member 74 reaches this circumferential step 86 of the nozzle tube 60, the movement of the shut-off member 74 in the direction of flow is stopped and a maximum open cross-section of the check valve is achieved.

A jet straightener 88 is inserted in the shroud tube 78 downstream of the streamlined body 70. The jet straightener 88 comprises a tubular region concentrically surrounding the longitudinal center axis 80 so that fluid can flow in the region immediately surrounding the longitudinal center axis concentrically. This tubular portion is supported by altogether four flow control surfaces that extend in the radial direction to the internal surface of the shroud tube 78. The outside edges of the flow control surfaces resting on the internal surface of the shroud tube 78 are, for example, welded to the shroud tube.

The spray nozzle 62 is essentially identical to the spray nozzle 14 described above with reference to FIGS. 1 to 3 and will therefore not be explained again at this juncture.

The shape of the streamlined body 70 can be discerned more clearly in the illustration shown in FIG. 13. The streamlined body 70, as regarded in the direction of flow, has a tip 90 pointing against the direction of flow and followed by a circular cone-shaped region 92 that widens in the direction of flow. The widened circular cone-shaped region 92 then merges into a region 94, in which the external walls of the streamlined body 70 extend in a direction parallel to the longitudinal center axis 80. The streamlined body 70 is connected to the valve seat disk 68 in the plain cylindrical region 94. The streamlined body 70 can be integral with the valve seat disk 68. The region 94 is thus not formed over the entire periphery of the streamlined body, but rather, the streamlined body 70 merges at this point into the walls of through bores in the valve seat disk 68, which surround the streamlined body 70 in the region 94 disposed radially outwardly of said body.

The region 94, in which the streamlined body 70 is connected to the valve seat disk 68, is adjoined by the conically tapered region of the valve seat 72. The conically widened region 92 thus has a larger radius at its transition to the region 94 than the inside radius of the shut-off member 74. The conically tapered valve seat 72 is adjoined by a region 96 that widens in the direction of flow. A transition between the valve seat 72 tapered in the direction of flow and the widened region 96 is of a curved shape. The widened region 96 is itself adjoined by a conically tapered region 98 that terminates in an end tip 100 lying on the longitudinal center axis 80. Surprisingly, this shape of the streamlined body 70 results in a reduced resistance of the check valve to flow and also achieves a good spray pattern of the nozzle 62 that remains constant over time. Surprisingly, positive effects on the resistance to flow and the spray pattern result from the shape of the streamlined body 70 downstream of the valve seat 72, including firstly the widened region 96 followed by the gently tapered region 98 that terminates in the end tip 100. The length of the tapered region 98 is equal to almost half the length of the entire streamlined body 70. On the other hand, the length of the region 92 widened conically starting from the tip 90 is equal to only approximately one fifth of the overall length of the streamlined body 70.

Figure 14:
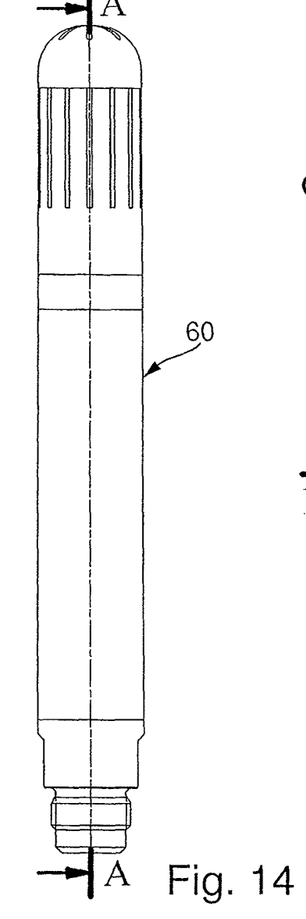
FIG. 14 is a side view of the nozzle tube shown in FIG. 10, with the spray nozzle omitted.
Figures 15, 18:
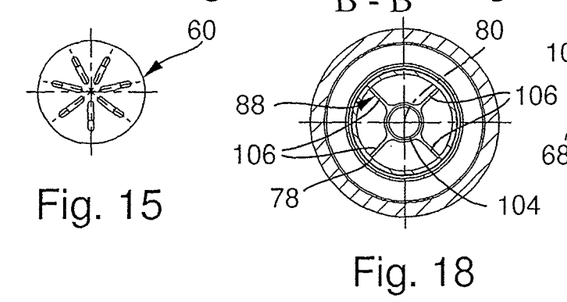
FIG. 15 is a top view of the nozzle tube shown in FIG. 14.
FIG. 18 is a view of the cross-sectional plane B-B shown in FIG. 16.

The illustration shown in FIG. 14 shows the nozzle tube 60, with the spray nozzle omitted. FIG. 15 is a top view of the nozzle tube 60 shown in FIG. 14. The cross-sectional view illustrated in FIG. 16 shows the check valve in its closed state, in which the annular shut-off member 74 rests against the valve seat 72 on the streamlined body 70.

Figures 16, 17:
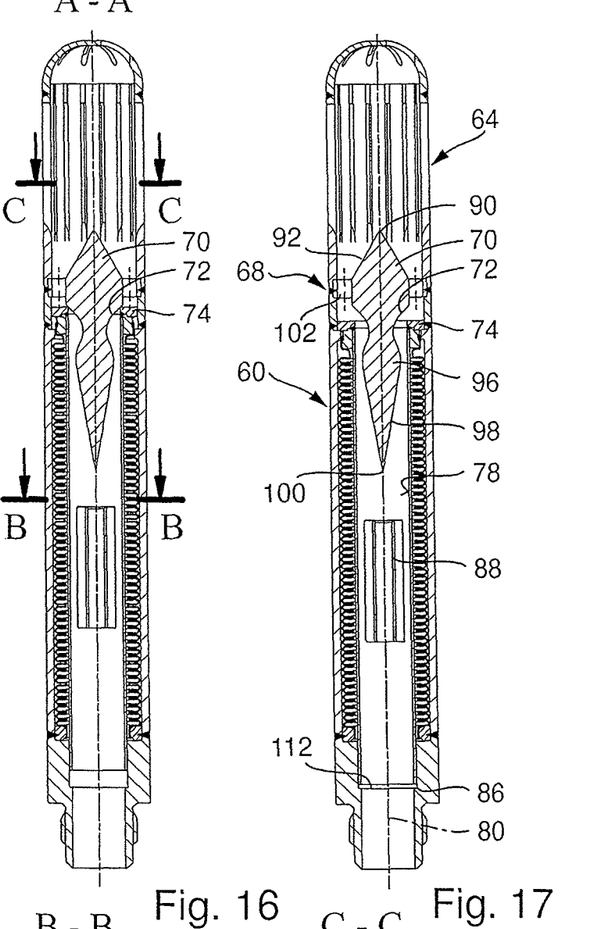
FIG. 16 is a view of the cross-sectional plane A-A of the nozzle tube shown in FIG. 14, with a check valve in the closed position.
FIG. 17 is a view of the cross-sectional plane A-A shown in FIG. 14, with the check valve in an open position.
Figure 19:
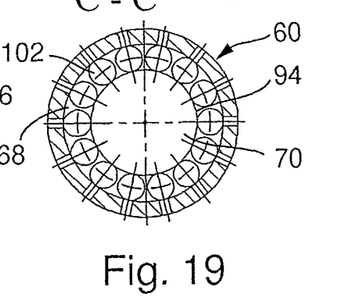
FIG. 19 is a view of the cross-sectional plane C-C shown in FIG. 16.

FIG. 17 shows the check valve in its open state. In this case the annular shut-off member 74 does not bear against the valve seat 72 so that fluid can now flow past the streamlined body 70 and through the jet straightener 88 to the spray nozzle. Consequently, fluid present in a feed line enters the nozzle tube 60 by way of the filter 64 and hits the tip 90 of the streamlined body 70. The fluid is then guided by the conically widened region 92 toward the valve seat disk 68 and can then pass through the through bores 102 in the valve seat disk 68. The through bores 102 in the valve seat disk 68 can be discerned in the cross-sectional view shown in FIG. 20. In all, there are provided 14 plain cylindrical through bores 102 that surround the streamlined body 70. The through bores 102 are dimensioned such that they reach the region 94 of the streamlined body and, at their other end, extend to an internal wall of the nozzle tube 60. In this way, spokes are formed between the through bores 102 on the valve seat disk 68, which spokes hold the streamlined body 70 in position.

The through bores 102 may be provided in the form of curved elongated holes instead of plain cylindrical through bores. For example, a spoke between any two through bores 102 might also have a through bore, in order to further increase the cross-section of free flow. Such through bores in the shape of curved elongated holes are described above with reference to FIG. 9.

After passing through the through bores 102 in the valve seat disk 68, the fluid flows through the space between the valve seat 72 and the annular shut-off member 74. As may be clearly seen from FIG. 17, the fluid is deflected inwardly toward the longitudinal center axis 80 and then gradually deflected again by the curved transition between the tapered valve seat 72 and the adjoining widened region 96 outwardly toward the internal wall of the shroud tube 78. After passing the local maximum between the regions 96 and 98 of the streamlined body 70, the cross-section of free flow increases again and the fluid can then move on in a direction parallel to the tapered region 98 and parallel to the shroud tube 78.

After the fluid has passed the end tip 100 of the streamlined body 70, it can then fill the entire internal space of the shroud tube 78 until it impinges on the jet straightener 88. The shape of the jet straightener 88 can be clearly discerned in the cross-sectional view shown in FIG. 18. The jet straightener 88 comprises a plain tube-shaped region 104 that causes the fluid to flow along the region directly adjacent to the longitudinal center axis 80. In all, four flow control surfaces 106 located at an equal distance from each other extend radially from the plain tube-shaped region 104. Any two flow control surfaces 106 enclose an angle of 90°. The outside edges of the flow control surfaces 106 are secured to the internal surface of the shroud tube 78.

The jet straightener 88 is followed by a region of the flow channel of constant cross-section defined by the inside diameter of the shroud tube 78. This flow channel of constant cross-section extends up to a conical taper in the nozzle mouthpiece 108 (see FIG. 12), which is then adjoined by the discharge orifice 110. This portion of flow channel of constant diameter is interrupted only by a small gap 112 between the downstream end of the shroud tube 78 and the step 86 on the nozzle tube 60. This region of the flow channel of constant cross-section is longer than the jet straightener 88 (see FIG. 12), and is also longer than the streamlined body 70. This makes it possible to achieve calming of the flow in the nozzle tube 60 from the jet straightener 88 to the discharge orifice 110, resulting in an excellent spray pattern of the nozzle 62.

During operation of the nozzle tube 60, the corrugated tube 76 is surrounded on both sides by pressurized fluid both in the closed state shown in FIG. 16 and in the open state shown in FIG. 17. This causes the corrugated tube to remain in the position shown in FIGS. 16 and 17, and it is not pressed laterally against the shroud tube 78 or the inside wall of the nozzle tube 60. The use of a corrugated tube 76 in place of a helical spring is only possible on account of the fact that descaling nozzles are operated at very high fluid pressures of several 100 bar. In the closed state shown in FIG. 16, fluid flows externally past the annular shut-off member 74 and then flows between the external periphery of the shut-off member 74 and the internal periphery of the filter housing 64 or the internal periphery of the nozzle tube 60 into the gap between the corrugated tube 76 and the nozzle tube 60. But the fluid cannot leave this gap in the region of the bottom end of the corrugated tube 76 in FIG. 16 since, as mentioned above, the corrugated tube 76 is welded at its end remote from the shut-off member 74 to the nozzle tube 60 in the region 82. Thus pressurized fluid acts upon the corrugated tube 76 at its radially outwardly located surface, but this fluid cannot flow through the nozzle tube and, in particular, cannot reach the spray nozzle 62.

Pressurized fluid likewise impinges on the radially inwardly located surface of the corrugated tube 76. Pressurized fluid can enter the space between the shroud tube 78 and the region 84 of the nozzle tube 60 (see FIG. 12) and can flow into the gap between the shroud tube 78 and the corrugated tube 76. Pressurized fluid will in any case act upon the corrugated tube 76 in the open state shown in FIG. 17 both on its radially inwardly located surface and on its radially outwardly located surface. The fluid pressures on the radially inwardly and outwardly located surfaces of the corrugated tube 76 are thus balanced and cancel each other out, so that the corrugated tube 76 can bias the shut-off member 74 toward the valve seat 72 with a predetermined spring force.

Figures 20, 21, 22, 23:
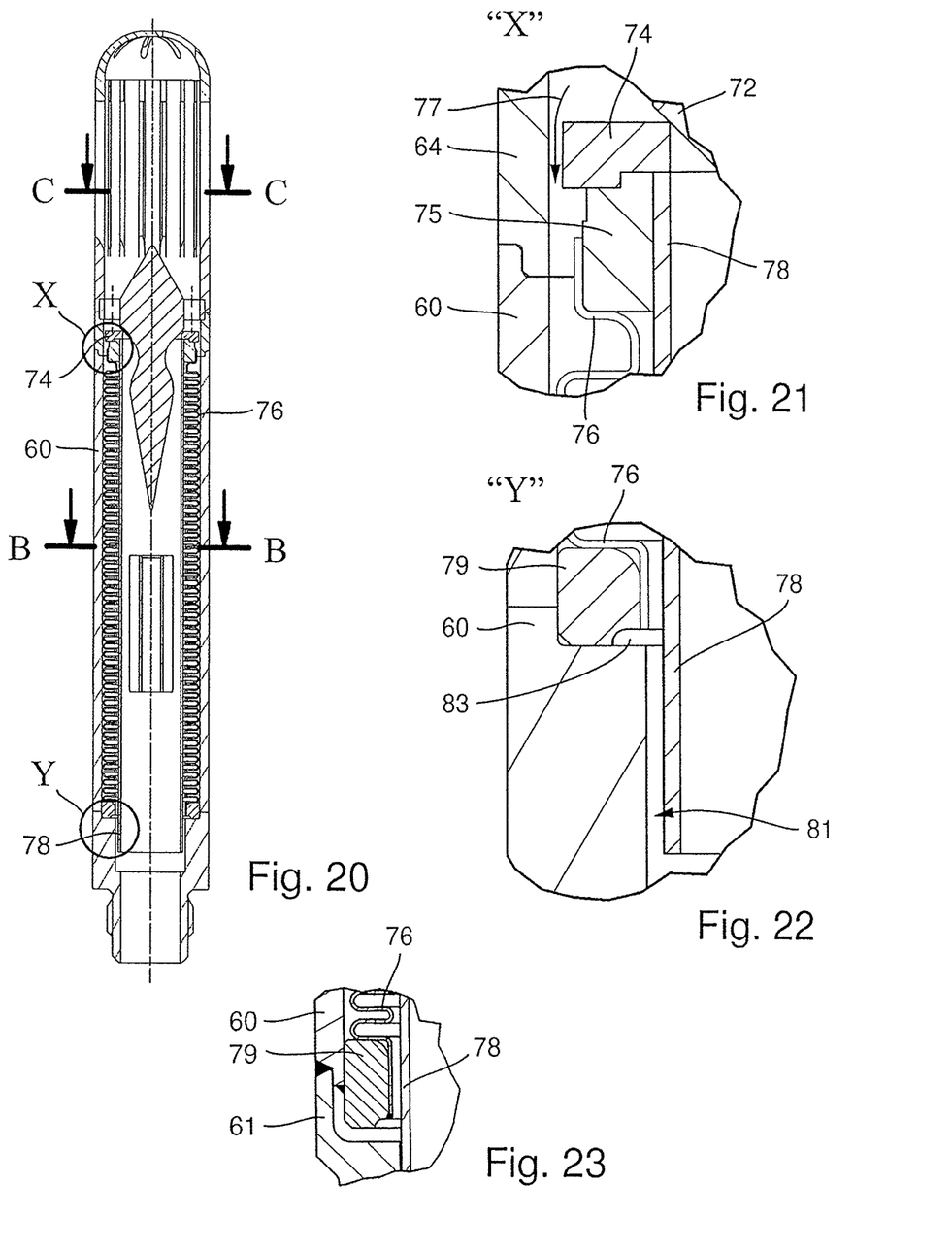
FIG. 20 is an illustration of the nozzle tube substantially identical to FIG. 16, in which a radial gap between the shut-off member and the nozzle tube and the radial gap between the shroud tube and the nozzle tube are exaggerated for the sake of clarity.
FIG. 21 shows the detail X of FIG. 20.
FIG. 22 shows the detail Y of FIG. 20.
FIG. 23 is a view of a further embodiment of the invention corresponding to detail Y.

The illustration shown in FIG. 20 is comparable to that shown in FIG. 16, in which a gap extending in the radial direction between an internal periphery of the nozzle tube 60 and the shut-off member 74 and a gap extending between the nozzle tube and the shroud tube 78 are exaggerated in the respective depictions of the details X and Y. This is to illustrate that fluid can enter both the region between the internal surface of the nozzle tube 60 and the corrugated tube 76 and the region between the internal surface of the corrugated tube 76 and the shroud tube 78.

The illustration shown in FIG. 21 shows the detail X of FIG. 20 drawn to a larger scale. The shut-off member 74 rests with its edge shown at the top of FIG. 21 at its radially inwardly located surface against the valve seat 72. The shut-off member 74, as regarded in the direction of flow, is adjoined by the shroud tube 78 and by the corrugated tube 76 that is connected to the shut-off member 74 by means of an intermediate ring 75, whilst the upstream end of the shroud tube 78 is also connected to the intermediate ring 75. Pressurized fluid will now be able to flow, as shown by the arrow 77, through the space between a radially outwardly located surface of the shut-off member 74 and a radially inwardly located surface of the filtering element 64 or of the nozzle tube 60 respectively and thus apply pressure to a radially outwardly located surface of the corrugated tube 76. As explained above, the fluid flows in the direction indicated by the arrow 77 only until the gap between the nozzle tube 60 and the corrugated tube 76 is completely filled with fluid. On the other hand, the flow of fluid toward the downstream end of the nozzle tube is not possible.

The illustration shown in FIG. 22 shows the downstream end of the corrugated tube 76. As explained above, the downstream end of the corrugated tube 76 is attached, for example welded, to a mounting ring 79 in a liquid-tight manner, and the mounting ring 79 is then likewise attached, more particularly welded, to the nozzle tube 60 in a liquid-tight manner (see FIG. 12).

As can be clearly discerned from FIG. 22, there is a gap between the internal surface of the nozzle tube 60 and the external surface of the shroud tube 78 so that an annular gap is defined, through which fluid can flow, in the direction indicated by the arrow 81, between the shroud tube 78 and the nozzle tube 60 into the region between the shroud tube 78 and the corrugated tube 76. Pressurized fluid in any case acts upon the radially internally and externally located surfaces of the corrugated tube 76 in the open state of the valve, so that no significant forces occur in the radial direction. As can be seen with reference to FIG. 22, fluid can flow into the space between the shroud tube 78 and the corrugated tube 76, as indicated by the arrow 81, only until this space is completely filled with liquid, since the corrugated tube 76 is attached to the intermediate ring 75 in a liquid-tight manner and the shroud tube 78 is also attached to the intermediate ring 75 in a liquid-tight manner (see FIG. 21).

As shown in FIG. 22, the mounting ring 79 rests on a step of the nozzle tube 60, and an annular recess 83 is provided on the radially inwardly located surface of the mounting ring 79. This recess 83 ensures that the mounting ring 79 rests directly on the step of the nozzle tube 60, since the corrugated tube 76 can protrude slightly into the recess 83 without interfering with the support of the mounting ring 79 on the nozzle tube 60.

The illustration shown in FIG. 23 shows a detail corresponding to the detail Y illustrated in FIG. 22. Unlike the embodiment shown in FIG. 22, the mounting ring 79 shown in FIG. 23 does not rest on the step of the nozzle tube 60, but is only attached to the internal surface of the nozzle tube 60 by means of a weld seam. As can be seen from FIG. 23, the mounting ring 79 can thus be moved by the check valve in and against the direction of flow. This feature is used during the assembly of the check valve in order to set the bias of the corrugated tube 76 precisely to a predefined value. During assembly, the mounting ring 79 is inserted, together with the corrugated tube 76 welded thereto, into the nozzle tube 60 before the downstream bottom portion 61 of the nozzle tube 60 has been welded. The mounting ring 79 is then moved in the longitudinal direction of the nozzle tube 60 until the defined bias of the corrugated tube 76 is reached, whereupon the mounting ring is welded to the nozzle tube 60.

The invention claimed is:

1. A check valve for a spray nozzle comprising a valve body, a shut-off member, and a valve seat, wherein said shut-off member is mounted for movement at least in a longitudinal direction of the valve body, wherein said shut-off member is attached to said valve body by a metal corrugated tube extending parallel to the longitudinal direction, wherein said shut-off member is biased toward the valve seat due to a spring effect of said metal corrugated tube, and wherein said shut-off member is disposed, as regarded in a direction of flow, at an upstream end of said metal corrugated tube, wherein at least in an opened state of the check valve, said metal corrugated tube is subjected, both on a radially inwardly located surface thereof and on a radially outwardly located surface thereof, to action of a pressurized fluid to be sprayed, wherein said shut-off member is located only upstream of said metal corrugated tube.

2. The check valve as defined in claim 1, wherein a shroud tube is provided within the metal corrugated tube, wherein said shroud tube forms part of a fluid channel through said check valve.

3. The check valve as defined in claim 2, wherein said shroud tube is rigidly attached at a first end to said shut-off member and is at a second end mounted for movement in relation to the valve body.

4. The check valve as defined in claim 1, wherein said valve seat is provided on a valve seat disk, which is used in a fluid channel of said check valve and is provided with at least one duct.

5. The check valve as defined in claim 4, wherein said at least one duct is formed by at least one through bore and/or a groove in said valve seat disk.

6. The check valve as defined in claim 1, wherein said valve seat is part of a streamlined body.

7. A nozzle tube comprising a filter for plugging into a feed line and the check valve as defined in claim 1.

8. The nozzle tube as defined in claim 7, wherein a shroud tube is provided within said metal corrugated tube, said valve seat is part of a streamlined body and a jet straightener is disposed in the shroud tube downstream of said streamlined body.

9. The nozzle tube as defined in claim 8, wherein said jet straightener has a plurality of flow control surfaces which extend in a radial direction toward a longitudinal center axis of said jet straightener, and wherein a region directly surrounding said longitudinal center axis is free from fixtures.

10. The nozzle tube as defined in claim 8, wherein a fluid channel of constant cross-section is formed downstream of said jet straightener.

11. The check valve of claim 1, wherein the shut-off member abuts the metal corrugated tube and is not located within the metal corrugated tube.

12. The check valve of claim 2, wherein the metal corrugated tube biases the shut-off member towards the valve seat to abut the valve seat to thereby prevent fluid flow through the valve body.

13. A check valve for a spray nozzle comprising a valve body, a shut-off member, and a valve seat, wherein said shut-off member is mounted for movement at least in a longitudinal direction of the valve body, wherein said shut-off member is attached to said valve body by a metal corrugated tube extending parallel to the longitudinal direction, wherein said shut-off member is biased toward the valve seat due to a spring effect of said metal corrugated tube, and wherein said shut-off member is disposed, as regarded in a direction of flow, at an upstream end of said metal corrugated tube, wherein at least in an opened state of the check valve, said metal corrugated tube is subjected, both on a radially inwardly located surface thereof and on a radially outwardly located surface thereof, to action of a pressurized fluid to be sprayed, wherein said valve seat is part of a streamlined body, and wherein said shut-off member is annular in shape and said streamlined body extends through said shut-off member.

14. A check valve for a spray nozzle comprising a valve body, a shut-off member, and a valve seat, wherein said shut-off member is mounted for movement at least in a longitudinal direction of the valve body, wherein said shut-off member is attached to said valve body by a metal corrugated tube extending parallel to the longitudinal direction, wherein said shut-off member is biased toward the valve seat due to a spring effect of said metal corrugated tube, and wherein said shut-off member is disposed, as regarded in a direction of flow, at an upstream end of said metal corrugated tube, wherein at least in an opened state of the check valve, said metal corrugated tube is subjected, both on a radially inwardly located surface thereof and on a radially outwardly located surface thereof, to action of a pressurized fluid to be sprayed, wherein said valve seat is part of a streamlined body, and wherein said streamlined body tapers in a region of said valve seat in the direction of flow and widens again downstream of said valve seat.

15. The check valve as defined in claim 14, wherein said streamlined body then again tapers to an end tip from a region of maximum diameter disposed downstream of said valve seat.

* * * * *